C. ANDERSEN.
Filters.

No. 148,399. Patented March 10, 1874.

Witnesses:
Ernst Bilhuber
Henry Gentner

Inventor:
Christian Andersen
by
VanSantvoord & Hauff
his atty

UNITED STATES PATENT OFFICE.

CHRISTIAN ANDERSEN, OF BROOKLYN, NEW YORK.

IMPROVEMENT IN FILTERS.

Specification forming part of Letters Patent No. 148,399, dated March 10, 1874; application filed February 19, 1874.

*To all whom it may concern:*

Be it known that I, CHRISTIAN ANDERSEN, of Brooklyn, in the county of Kings and State of New York, have invented a new and useful Improvement in Filters; and I do hereby declare the following to be a full, clear, and exact description thereof, which will enable those skilled in the art to make and use the same, reference being had to the accompanying drawing forming part of this specification, in which drawing—

Figure 1:
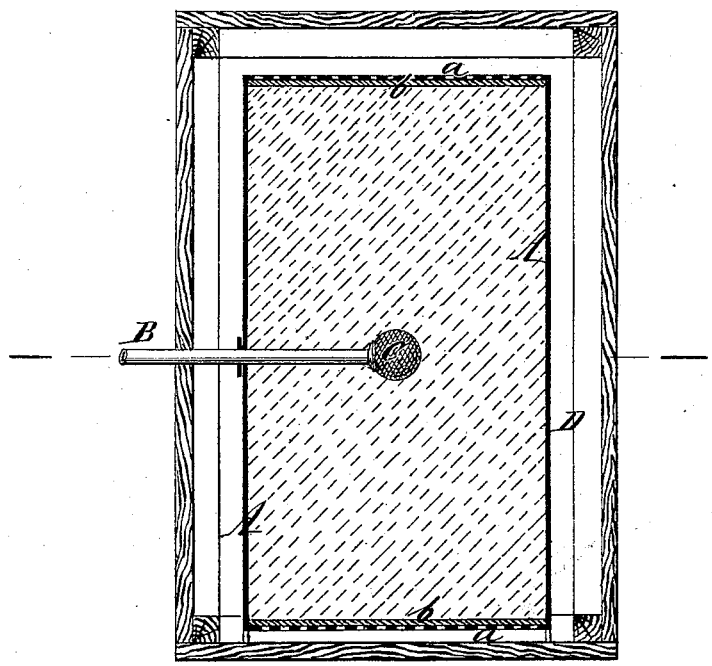
Figure 2:
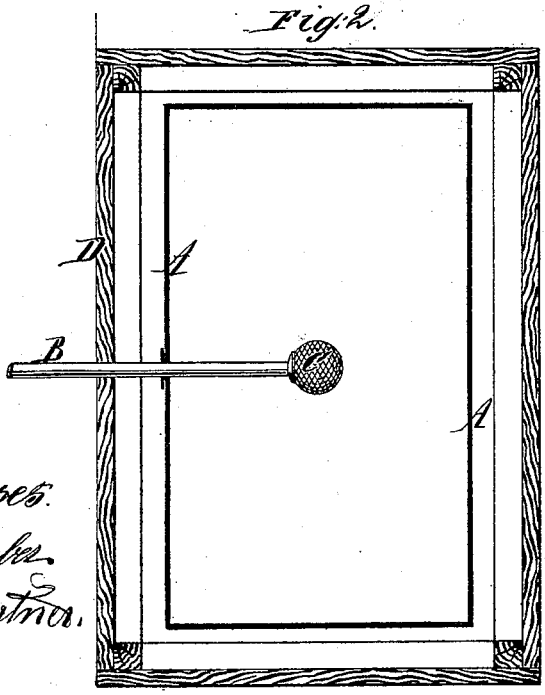

Figure 1 represents a vertical section of my invention. Fig. 2 is a horizontal section of the same.

Similar letters indicate corresponding parts.

This invention consists in a filtering-vessel, the sides or heads of which are perforated and protected by a lining of cloth or other suitable material, in combination with a supply-pipe, which passes to the center of the filtering-vessel, and terminates, at its inner end, in a rose-head, while the filtering-vessel is inclosed in an open tank in such a manner that the liquid admitted through the supply-pipe is caused to discharge in fine jets from all sides of the rose-head, and, after said liquid has passed through the filtering material, all the impurities still mixed with it are retained by the lining over the perforations of the filtering-vessel, and the liquid, on passing from the filtering-vessel, is clear and pure.

In the drawing, the letter A designates a filtering-vessel, which is made square or cylindrical, or of any other desired form or shape, of sheet metal or other suitable material. The heads or sides *a a* of this vessel are perforated with a large number of small holes, and these foraminous sides are lined on the inside with a layer, *b*, of cloth or other filtering material. Through one side of the vessel A extends the liquid-supply pipe B, which terminates in a rose-head, C, that is situated at or near the center of the filtering-vessel A. The vessel A is placed in an open tank, D, and, after the same has been charged with bone-black or other suitable filtering material, the liquid to be filtered is admitted through the pipe B. By the rose-head C this pipe is prevented from being choked by the filtering material, and the liquid, on reaching the rose-head, is distributed in a number of fine jets, which percolate the filtering material in all directions.

After being passed through the filtering material, the liquid discharges through the layers *b* and the foraminous sides *a a*, and, by the layers *b* of cloth or other equivalent material, the impurities which the liquid may take up from the filtering material are retained, and said liquid collects in a clear and pure state in the tank D, from which the same is drawn off by a suitable faucet or gate.

By the rose-head C, the liquid is uniformly distributed throughout the filtering material, and, since the discharge-openings of the vessel A are protected by cloth or other equivalent material, the liquid is prevented from carrying off small particles of the filtering material, and a pure product is obtained.

What I claim as new, and desire to secure by Letters Patent, is—

The combination of layers *b*, of cloth or other suitable material, with one or more foraminous sides of the filtering-vessel A, the supply-pipe B, and rose-head C, all constructed and operating substantially as shown and described.

C. ANDERSEN.

Witnesses:
W. HAUFF,
E. F. KASTENHUBER.